United States Patent
Sonoda et al.

(10) Patent No.: US 9,215,237 B2
(45) Date of Patent: Dec. 15, 2015

(54) COMMUNICATION SYSTEM, CONTROL DEVICE, COMMUNICATION METHOD, AND PROGRAM

(75) Inventors: Kentaro Sonoda, Tokyo (JP); Hideyuki Shimonishi, Tokyo (JP); Masayuki Nakae, Tokyo (JP); Masaya Yamagata, Tokyo (JP); Yoichiro Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 14/119,827

(22) PCT Filed: May 22, 2012

(86) PCT No.: PCT/JP2012/003336
§ 371 (c)(1),
(2), (4) Date: Nov. 22, 2013

(87) PCT Pub. No.: WO2012/160809
PCT Pub. Date: Nov. 29, 2012

(65) Prior Publication Data
US 2014/0075510 A1 Mar. 13, 2014

(30) Foreign Application Priority Data
May 23, 2011 (JP) .................................. 2011-115104

(51) Int. Cl.
H04L 29/06 (2006.01)
(52) U.S. Cl.
CPC ............ H04L 63/105 (2013.01); *H04L 63/0236* (2013.01); *H04L 63/20* (2013.01)
(58) Field of Classification Search
CPC .... H04L 63/105; H04L 63/0236; H04L 63/20
USPC ........................................................... 726/3
See application file for complete search history.

(56) References Cited

U.S. PATENT DOCUMENTS 7,051,077 B2     5/2006  Lin
7,266,475 B1 *   9/2007  Bade et al. ..................... 702/182
(Continued)

FOREIGN PATENT DOCUMENTS

JP    2005-346183 A    12/2005
JP    2007-52550 A     3/2007
(Continued)

OTHER PUBLICATIONS

Ankur Nayak, et al: "Resonance: Dynamic Access Control for Enterprise Networks", Proceedings of the 1st ACM Workshop on Research on Enterprise Networking, WREN'09, Aug. 21, 2009, pp. 11-18.
(Continued)

*Primary Examiner* — Michael S McNally
(74) *Attorney, Agent, or Firm* — McGinn IP Law Group, PLLC.

(57) ABSTRACT

A communication system includes an information acquisition unit that acquires information for determining an isolation level to which a user terminal belongs, from the user terminal; an isolation level determination unit that determines an isolation level to which the user terminal belongs, based on the acquired information; an isolation level information storage unit that defines whether or not access is possible to respective access destinations for each isolation level; an access control unit that causes a forwarding node(s) to implement forwarding or dropping of a packet, in accordance with whether or not access is possible to the respective access destinations; and a forwarding node(s) that forwards a packet in accordance with control of the access control unit. Stepwise access control is realized using isolation levels.

18 Claims, 16 Drawing Sheets

(56) References Cited

U.S. PATENT DOCUMENTS

| | | | |
|---|---|---|---|
| 7,272,719 B2 * | 9/2007 | Bleckmann et al. | 713/176 |
| 7,680,890 B1 | 3/2010 | Lin | |
| 7,953,814 B1 | 5/2011 | Chasin et al. | |
| 8,191,124 B2 * | 5/2012 | Wynn et al. | 726/6 |
| 8,316,227 B2 * | 11/2012 | Nolan et al. | 713/151 |
| 8,363,793 B2 | 1/2013 | Chasin et al. | |
| 8,484,295 B2 | 7/2013 | Chasin et al. | |
| 8,856,330 B2 * | 10/2014 | Rangappan | 709/225 |
| 2005/0138417 A1 | 6/2005 | McNerney et al. | |
| 2007/0011725 A1 | 1/2007 | Sahay et al. | |
| 2007/0107059 A1 | 5/2007 | Chasin et al. | |
| 2007/0244974 A1 | 10/2007 | Chasin | |
| 2008/0189769 A1 * | 8/2008 | Casado et al. | 726/4 |
| 2013/0117397 A1 | 5/2013 | Chasin et al. | |

FOREIGN PATENT DOCUMENTS

| | | |
|---|---|---|
| JP | 2009-515426 A | 4/2009 |
| JP | 2010-118745 A | 5/2010 |
| JP | 2010-287932 A | 12/2010 |
| WO | WO 2008/095010 A1 | 8/2008 |

OTHER PUBLICATIONS

Tajima Yoshitake, et al: "Quarantine Network with Secure Enterprise Network Access Control System", NTT Technical Review, Telecommunications Association, Tokyo, JP, vol. 4, No. 4, Apr. 2006, pp. 41-45.

European Search Report dated Oct. 29, 2014.

International Search Report dated Mar. 7, 2012 in International Patent Application Publication No. PCT/JP2012/003336.

Nick McKeown, and 7 others, "OpenFlow: Enabling Innovation in Campus Networks", [online] [search conducted May 16, 2011] Internet URL: http://www.openflowswitch.org/documents/openflow-wp-latest.pdf.

"OpenFlow: Switch Specification" Version 1.0.0. (Wire Protocol 0x01), [search conducted May 16, 2011] Internet URL: http://www.openflowswitch.org/documents/openflow-spec-v1.0.0.pdf.

* cited by examiner

FIG.3

| USER ID | ROLE ID | ATTRIBUTES |
|---|---|---|
| user1 | role_0001 role_0002 | IP:192.168.100.1 MAC:00-00-00-44-55-66 |
| user2 | role_0002 | IP:192.168.100.2 MAC:00-00-00-77-88-99 |
| .. | .. | .. |

FIG.4

| ROLE ID | RESOURCE GROUP ID | ACCESS RIGHTS |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| .. | .. | .. |

FIG.5

| RESOURCE GROUP ID | RESOURCE ID | RESOURCE ATTRIBUTES |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| | resource_000X | IP:YYY.YYY.Y.Y |
| | .. | .. |
| resource_group_0002 | .. | .. |

FIG.6

| SOURCE | DESTINATION | ACCESS RIGHTS | CONDITION (OPTION) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| 192.168.100.1 | 192.168.0.3 | deny | |
| .. | .. | .. | .. |

FIG. 8

| ISOLATION LEVEL | ACCESS RANGE (ALLOWED RESOURCE) | CONDITION |
|---|---|---|
| 1 | PUBLIC SERVER ACCESSIBLE FROM OUTSIDE | PRESCRIBED FORBIDDEN APPLICATIONS NOT PRESENT |
| 2 | GENERAL INFORMATION SHARED SERVER | ALL PATCHES FOR PRESCRIBED APPLICATIONS HAVE BEEN APPLIED |
| 3 | FILE SERVER INCLUDING CONFIDENTIAL INFORMATION | VIRUS DEFINITION FILE IS UP TO DATE |
| . . | . . | . . |

COMMUNICATION SYSTEM, CONTROL DEVICE, COMMUNICATION METHOD, AND PROGRAM

REFERENCE TO RELATED APPLICATION

This application is based upon and claims the benefit of the priority of Japanese patent application No. 2011-115104, filed on May 23, 2011, the disclosure of which is incorporated herein in its entirety by reference thereto. This invention relates to a communication system, a control device (control apparatus), a quarantine method (communication method), and a computer program, and in particular to a communication system, a control device (control apparatus), a communication method, and a computer program for performing access control by controlling a forwarding node.

BACKGROUND ART

Recently, many companies have been introducing quarantine systems for in-company networks. A quarantine system is a mechanism by which a computer that is trying to connect to an in-company network is temporarily connected to a test network, a check for infection by computer viruses or a security check of software installed in the computer is performed, and confirmation is made that there is no problem, before allowing connection to the in-company network. In establishing the quarantine system, in general a method is used where a combination is made with a user authentication device or terminal authentication device, and a computer is connected to the in-company network and test network in accordance with the outcome of the authentication. Furthermore, a VLAN (Virtual Local Area Network) is often used for distinguishing between an in-company network and a test network. A VLAN relates to technology for building a logical network that does not depend on the physical structure of the network.

Cited Publication 1 discloses a network connection control system in which, when a computer tries to connect to a network, resource information of the computer is collected and a check is made as to whether or not a policy for connecting to the network is satisfied, before allowing only a computer that satisfies the policy to connect to the network.

Furthermore, Cited Publication 2 discloses a system inside a private network that includes a plurality of registered company networks, and is provided with processing nodes configured so that only allowed inbound messages (inbound messages transmitted by one or more authenticated message forwarding nodes) are transmitted to a registered company network, and a control node configured so as to maintain registration of a plurality of message forwarding nodes related to a company network.

In recent years, technology known as OpenFlow has been proposed (refer to Patent Literature 3, and Non Patent Literatures 1 and 2). In OpenFlow, communication is treated as end-to-end flow, and path control, recovery from failure, load balancing, and optimization are performed in flow units. An OpenFlow switch as specified in Non Patent Literature 2 is provided with a secure channel for communication with an OpenFlow controller positioned as a control device, and operates according to a flow table in which appropriate addition or rewriting is instructed by the OpenFlow controller. In the flow table are definitions of sets of matching rules (Header fields) for collation with packet headers, flow statistical information (Counters), and actions (Actions) defining processing content, for each flow (refer to FIG. 16).

For example, when an OpenFlow switch receives a packet, an entry is searched for that has a matching rule (refer to header field in FIG. 16) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Actions field of the entry in question, for the received packet. On the other hand, as a result of the search, in a case where an entry matching the received packet is not found, the OpenFlow switch transmits the received packet to the OpenFlow controller via a secure channel, requests determination of a path of the packet based on source and destination of the received packet, receives a flow entry realizing this, and updates the flow table. In this way, the OpenFlow switch uses the entry stored in the flow table as a processing rule (packet handling operation) to perform packet forwarding.

CITATION LIST

Patent Literature

[Patent Literature 1] Japanese Patent Kokai Publication No. JP2005-346183A
[Patent Literature 2] Japanese Patent Kohyo Publication No. JP2009-515426A
[Patent Literature 3] International Publication No. WO2008/095010A1

Non Patent Literature

[Non Patent Literature 1]
Nick McKeown, and 7 others, "OpenFlow: Enabling Innovation in Campus Networks", [online] [search conducted May 16, 2011] Internet URL: http://www.openflowswitch.org/doeuments/openflow-wp-latest.pdf
[Non Patent Literature 2]
"OpenFlow: Switch Specification" Version 1.0.0. (Wire Protocol 0x01), [search conducted May 16, 2011] Internet URL: http://www.openflowswitch.org/documents/openflow-spec-v1.0.0.pdf

SUMMARY OF INVENTION

Technical Problem

The entire disclosures of the abovementioned Patent Literatures 1, 2 and 3 and Non Patent Literatures 1 and 2 are incorporated herein by reference thereto. In a network connection control system of Patent Literature 1, however, there is a problem in that a user who is using a computer cannot connect at all to a network until checking of resource information of the computer is completed, or, in a case where it is once judged that a network connection condition is not satisfied, there is a problem in that a cut-off state is maintained. Furthermore, the system of Patent Literature 2 also merely performs filtering or similar with regard to messages such as electronic mail based on a filtering policy defined in a policy for each user, and does not disclose a mechanism for performing access restriction based on a quarantine result or the like.

Patent Literature 3 and Non Patent Literatures 1 and 2 also do not describe performing quarantine processing, or, based on a result thereof, performing control to isolate a certain flow.

It is an object thereof to provide a communication system, a control device (control apparatus), a quarantine method (communication method), and a program, for performing stepwise access control using isolation levels indicating a user accessible range or a user non-accessible range.

Solution to Problem

According to a first aspect there is provided a communication system, comprising: an information acquisition unit that acquires information for determining an isolation level to which a user terminal belongs, from the user terminal; an isolation level determination unit that determines an isolation level to which the user terminal belongs, based on the acquired information; an isolation level information storage unit that defines whether or not access is possible to respective access destinations for each isolation level; an access control unit that causes a forwarding node(s) to implement forwarding or dropping of a packet, in accordance with whether or not access is possible to the respective access destinations; and a forwarding node(s) that forwards a packet in accordance with control of the access control unit.

According to a second aspect there is provided a control device (control apparatus), adapted to be disposed in a communication system including an information acquisition unit that acquires information for determining an isolation level to which a user terminal belongs, from the user terminal, and a forwarding node that forwards a packet in accordance with control of the control device (control apparatus), the control device (control apparatus) comprising: an isolation level determination unit that determines an isolation level to which the user terminal belongs, based on information acquired in the information acquisition unit; an isolation level information storage unit that defines whether or not access is possible to respective access destinations for each of the isolation levels; and an access control unit that causes a forwarding node(s) to implement forwarding or dropping of a packet, in accordance with whether or not access is possible to the respective access destinations.

According to a third aspect there is provided a communication method, comprising: a step of acquiring information for determining an isolation level to which a user terminal belongs, from the user terminal; a step of determining an isolation level to which the user terminal belongs, based on the acquired information; and a step of referring to isolation level information defining whether or not access is possible to respective access destinations, for each of the isolation levels, and causing a forwarding node(s) to implement forwarding or dropping of a packet, in accordance with whether or not access is possible to the respective access destinations. The present method is linked with a specific apparatus, known as a control device control apparatus) that controls the forwarding node.

According to a fourth aspect there is provided a computer program that executes in a computer disposed in a communication system including an information acquisition unit that acquires information for determining an isolation level to which a user terminal belongs, from the user terminal, and a forwarding node(s) that forwards a packet in accordance with control of a control device (control apparatus): the program executing a process of determining an isolation level to which the user terminal belongs, based on the information acquired in the information acquisition unit; and a process of referring to isolation level information defining whether or not access is possible to respective access destinations, for each of the isolation levels, and causing a forwarding node(s) to implement forwarding or dropping of a packet, in accordance with whether or not access is possible to the respective access destinations. It is to be noted that that this program can be recorded on a computer-readable storage medium which may be non-transient. That is, the present invention can be embodied as a computer program product.

The meritorious effects of the present invention are summarized as follows. According to the present invention it is possible to realize stepwise access control using isolation levels.

BRIEF DESCRIPTION OF DRAWINGS

FIG. 3 is an example of authentication information held in an authentication device of the first exemplary embodiment of the disclosure;

FIG. 4 is an example of communication policy information stored in a communication policy storage unit of the first exemplary embodiment of the disclosure;

FIG. 5 is an example of resource information stored in a resource information storage unit of the first exemplary embodiment of the disclosure;

FIG. 6 is an example of a communication policy communicated to a control device from a policy management device of the first exemplary embodiment of the disclosure;

FIG. 8 is a descriptive diagram showing an example of isolation level information stored in an isolation level information storage unit of the first exemplary embodiment of the disclosure;

DESCRIPTION OF EMBODIMENTS

Figure 1:
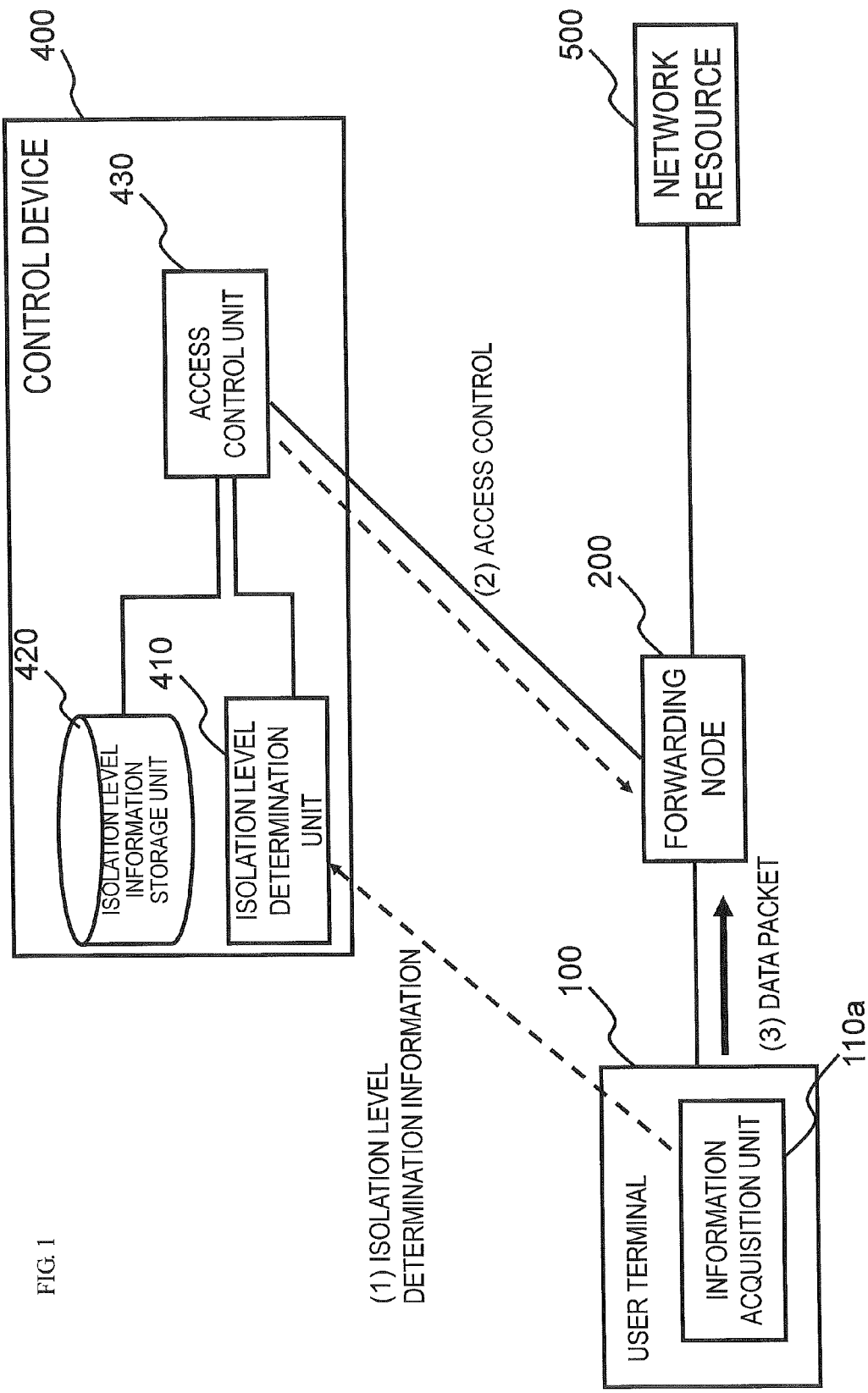
FIG. 1 is a diagram for describing an outline of an exemplary embodiment of the present disclosure.

First a description is given of an outline of an exemplary embodiment of the present disclosure, making reference to the drawings. As shown in FIG. 1, the disclosure can be realized by a configuration including a forwarding node 200 disposed between a user terminal 100 and a network resource 500, and a control device 400 for controlling the forwarding node 200. It is to be noted that reference signs to drawings appended in this outline are added for convenience to respective elements as an example in order to aid understanding and are not intended to limit the disclosure to modes shown in the drawings.

More specifically, the user terminal 100 is provided with an information acquisition unit 110a that acquires information for determining an isolation level to which the user terminal belongs, and transmits information to the control device 400. It is to be noted that in the example in FIG. 1, the user terminal 100 is provided with the information acquisition unit 110a, but it is also possible to use a configuration in which a server for performing information acquisition processing interactively with the user terminal 100 is provided separately.

Furthermore, the control device 400 is configured to include an isolation level determination unit 410 that determines an isolation level to which the user terminal belongs, based on information transmitted from the information acquisition unit 110a, an isolation level information storage unit 420 that defines whether or not access is possible to respective access destinations for each isolation level, and an access control unit 430 that causes a forwarding node to implement forwarding or dropping of a packet in accordance with whether or not access is possible to the respective access destinations as determined by the isolation level information storage unit 420.

The information acquisition unit 110a of the user terminal 100 executes a process of acquiring information for determining the isolation level to which the user terminal belongs, at prescribed timing such as when a connection is made to a network or the like, and notifies a result thereof to the control device 400 ((1) isolation level determination information in FIG. 1).

The control device 400 determines the isolation level to which (a user of) the user terminal 100 belongs, based on the information. Furthermore, the control device 400 reads information (refer to FIG. 8) as to whether or not access is possible to respective access destinations corresponding to the determined isolation level, from the isolation level information storage unit 420, and controls the forwarding node 200 to allow or deny access to the network resource 500 ((2) access control in FIG. 1).

By arranging as above, it is possible to perform stepwise access control based on the isolation level. For example, at a certain point in time, in the user terminal 100 which has been denied access due to not satisfying a condition required by an access destination, uninstalling an application program (referred to below as "application"), applying the latest patch to the application, updating a virus definition file, scanning of a system by a virus definition file and the like are implemented. In this way, in a case where a condition required by the access destination becomes is by the user terminal in question, it is possible to change the isolation level and to allow access to the access destination thereafter. Conversely, for example, at a certain point in time, in a case where the user terminal 100 that is allowed access to a certain access destination no longer satisfies a condition required by the access destination, it is possible to change the isolation level in the control device 400 and to deny access to the access destination thereafter.

Figure 10:
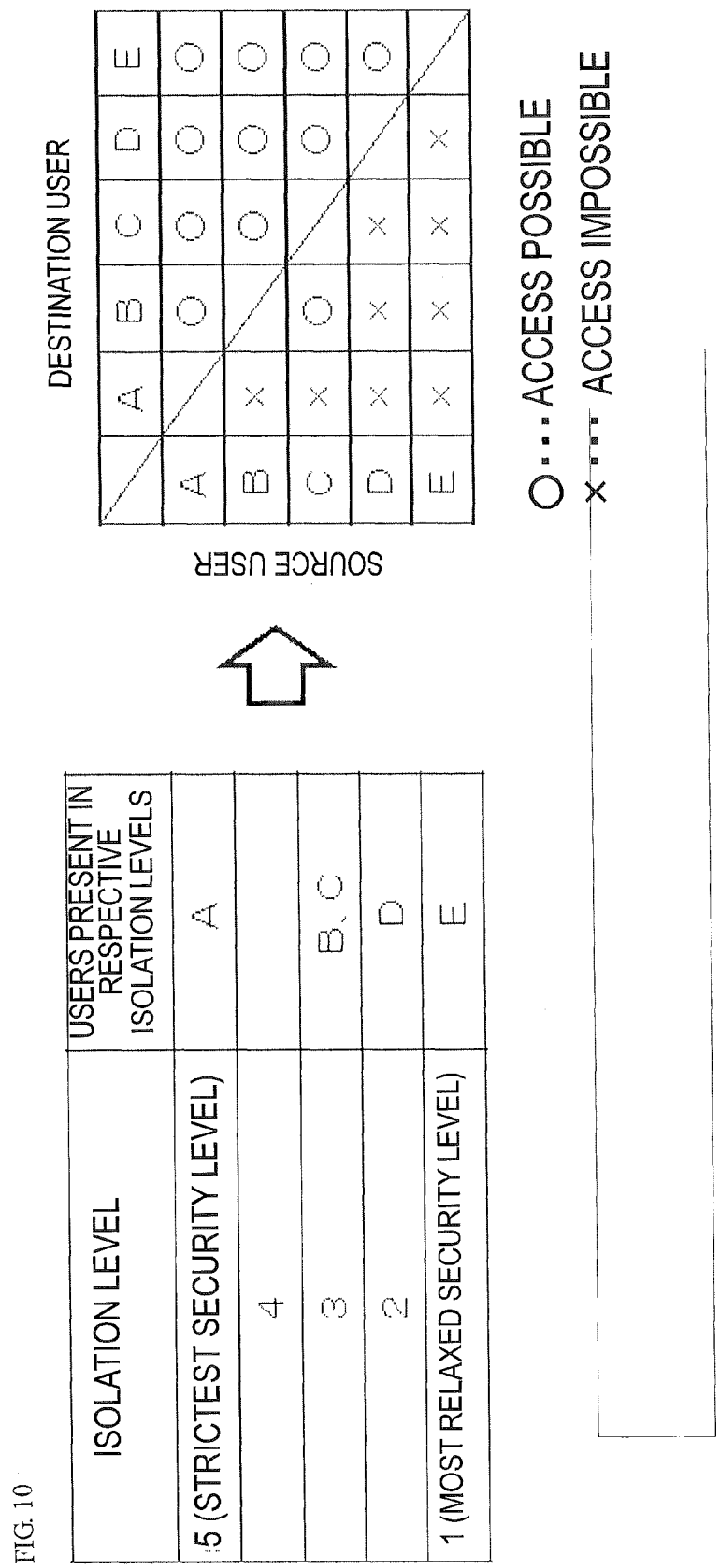
FIG. 10 is a diagram for describing a process of determining whether or not access is possible among users using an isolation level of the first exemplary embodiment of the disclosure.

In addition, the isolation level determined in this way can also be used as information for determining whether or not access is possible between users, as shown in FIG. 10. A detailed description is given in a first exemplary embodiment with regard to this point.

First Exemplary Embodiment

Figure 2:
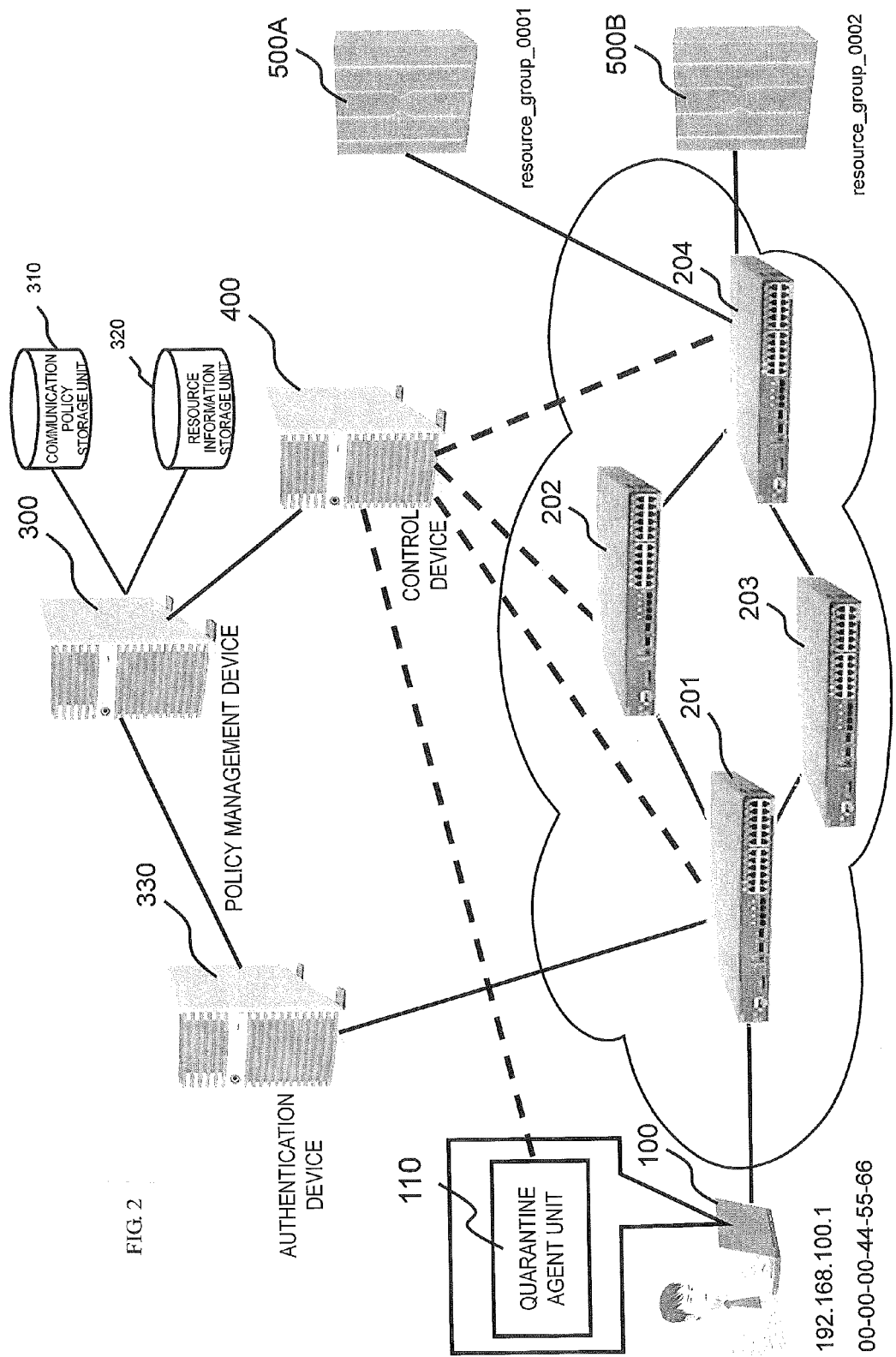
FIG. 2 is a diagram representing a configuration of a communication system of a first exemplary embodiment of the disclosure.

Next, a detailed description is given concerning a first exemplary embodiment of the present disclosure, making reference to the drawings. FIG. 2 is a diagram representing a configuration of a communication system of the first exemplary embodiment of the disclosure. Referring to FIG. 2, a configuration is shown that includes a plurality of forwarding nodes 201 to 204, a control device 400 for setting a processing rule (packet handling operation) in the forwarding nodes, a policy management device 300 for notifying a communication policy to the control device 400, and an authentication device 330 for providing authentication information indicating an authentication result to the policy management device 300.

Figure 16:
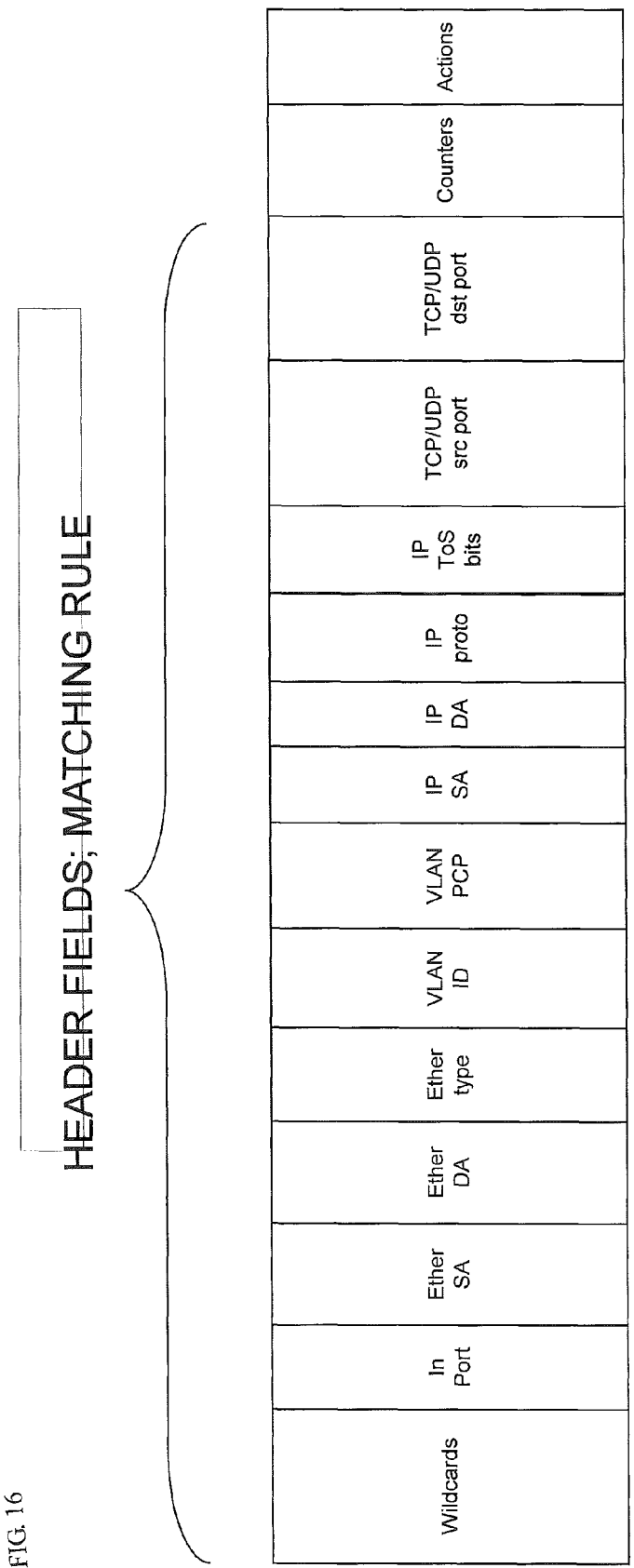
FIG. 16 is a diagram representing a configuration of a flow entry described in Non Patent Literature 2.

The forwarding nodes 201 to 204 are switching devices for processing a received packet in accordance with a processing rule (packet handling operation) that associates a matching rule matching the received packet and processing content to be applied to the packet that conforms to the matching rule. OpenFlow switches of Non Patent Literature 2, which operate a flow entry shown in FIG. 16 as a processing rule (packet handling operation), can be used as these forwarding nodes 201 to 204.

Furthermore, network resources 500A and 500B are connected to the forwarding node 204 and a user terminal 100 can communicate with the network resources 500A and 500B via the forwarding nodes 201 to 204. In the following exemplary embodiment, the network resource 500A and the network resource 500B each belong to different resource groups, and resource_group_0001 and resource_group_0002 are assigned as respective resource group IDs.

The authentication device 330 is an authentication server or the like, for performing a user authentication procedure with the user terminal 100, using a password or biometric authentication information. The authentication device 330 transmits authentication information indicating a result of the user authentication procedure with the user terminal 100 to the policy management device 300. Furthermore, in a case of success in authentication of the user terminal in a result of the authentication procedure with the user terminal 100, the authentication device 330 instructs the user terminal 100 to execute quarantine processing of this user terminal.

FIG. 3 is an example of authentication information held in the authentication device 330 in the present exemplary embodiment. For example, in a case of successful authentication of a user whose user ID is user1, the authentication device 330 transmits an entry for user1 of attributes: user1, IP address: 192.168.100.1, MAC address: 00-00-00-44-55-66, and role ID: role_0001 and role_0002, as authentication information to the policy management device 300. In the same way, in a case of successful authentication of a user whose user ID is user2, it transmits an entry for user2 of attributes: user2, IP address: 192.168.100.2, MAC address: 00-00-00-77-88-99, and role ID: role_0002, as authentication information to the policy management device 300.

It is to be noted that the authentication information is not limited to the example in FIG. 3, and may be information that enables determination of communication policy assigned to a user by the policy management device 300. For example, it is possible to use the user ID of a user for whom authentication has succeeded, role ID derived from the user ID, address ID such as a MAC address or the like, location information of the user terminal 100, or a combination of these, as the authentication information. Clearly, information of a user for whom authentication has failed may be transmitted to the policy management device 300 as authentication information, and the policy management device 300 may transmit to the control device 400 a communication policy restricting access from the user in question.

The policy management device 300 is connected to a communication policy storage unit 310 and a resource information storage unit 320, and is a device for determining a communication policy corresponding to authentication information received from the authentication device 330 to be transmitted to the control device 400.

FIG. 4 is an example of communication policy information stored in the communication policy storage unit 310. The example in FIG. 4 shows resource group ID assigned to a group of resources, and communication policy information setting access rights, for each role distinguished by the role ID. For example, a user having the role ID: role__0001 is allowed access to two resource groups having resource group IDs: resource_group__0001 and resource_group__0002. On the other hand, a user having the role ID: role__0002 is denied access to the resource group ID: resource_group__0001 but is allowed access to resource_group__0002.

FIG. 5 is an example of resource information stored in the resource information storage unit 320. The example in FIG. 5 has content associating resource IDs of resources belonging to the abovementioned resource group IDs and detailed attributes thereof. For example, in a group specified by the resource group ID: resource_group__0001, the resources: resource__0001, resource__0002, and resource__0003 are included, and it is possible to identify respective IP addresses, MAC addresses, and port numbers used for services.

Referring to the communication policy information and the resource information as described above, the policy management device 300 determines a communication policy for a user who has received authentication by the authentication device 330, and gives notification to the control device 400. For example, by a role ID included in authentication information received from the authentication device 330, it is possible to specify a resource group ID attached to the role ID in question and the content of access rights thereof, from the policy information in FIG. 4. Using information of resources belonging to the resource group ID from the resource information in FIG. 5, the communication policy is created.

FIG. 6 shows communication policy applicable to a user having the user ID: user1 created from the information shown in FIG. 3, FIG. 4, and FIG. 5. Attribute information of the user ID: user1 in the authentication information in FIG. 3 is set in a source field in FIG. 6. Based on the content of ID: role__0001 of the policy information in FIG. 4, a resource attribute extracted from the resource information in FIG. 5 is set in a destination field. Furthermore, a value that is the same as the access rights of the role ID: role__0001 of the policy information in FIG. 4 is set in an access rights field. A service and port number that are set in the resource attribute field of the resource information in FIG. 5 are set in the condition (option) field.

A quarantine agent unit 110 of the user terminal 100 corresponds to the information acquisition unit 110a described above, and when an instruction to execute a quarantine process is received from the authentication device 330, the quarantine agent unit 110 executes the quarantine process for the user terminal 100 and transmits a result of the processing content to an isolation level determination unit 410 of the control device 400. The quarantine process of the quarantine agent unit 110 may be, for example, version confirmation of the operating system (OS) or of a virus definition file for anti-virus software, an installation state of an application, an application state of a patch for the OS or application, or a system scan history using a virus definition file, or the like. The quarantine process may be the same as processing content implemented by an already present quarantine system or software, or other new processing content may be added.

In the present exemplary embodiment, the quarantine agent unit 110 is assumed to be installed in the user terminal, but it is also possible to provide the quarantine agent unit 110 externally to the user terminal as a quarantine agent device or quarantine server. In this case, with respect to the authentication device 330, the quarantine agent device or the quarantine server or the user terminal 110 that receives a request from these transmits a result of the processing content to the isolation level determination unit 410 of the control device 400.

The control device 400 is a device that uses the above described type of communication policy transmitted from the policy management device 300 and a result of quarantine processing received from the quarantine agent unit 110 of the user terminal 100, to determine a network resource that can be accessed from the user terminal 100, and to control the forwarding nodes 201 to 204 so that a packet transmitted from the user terminal 100 reaches the network resource.

Figure 7:
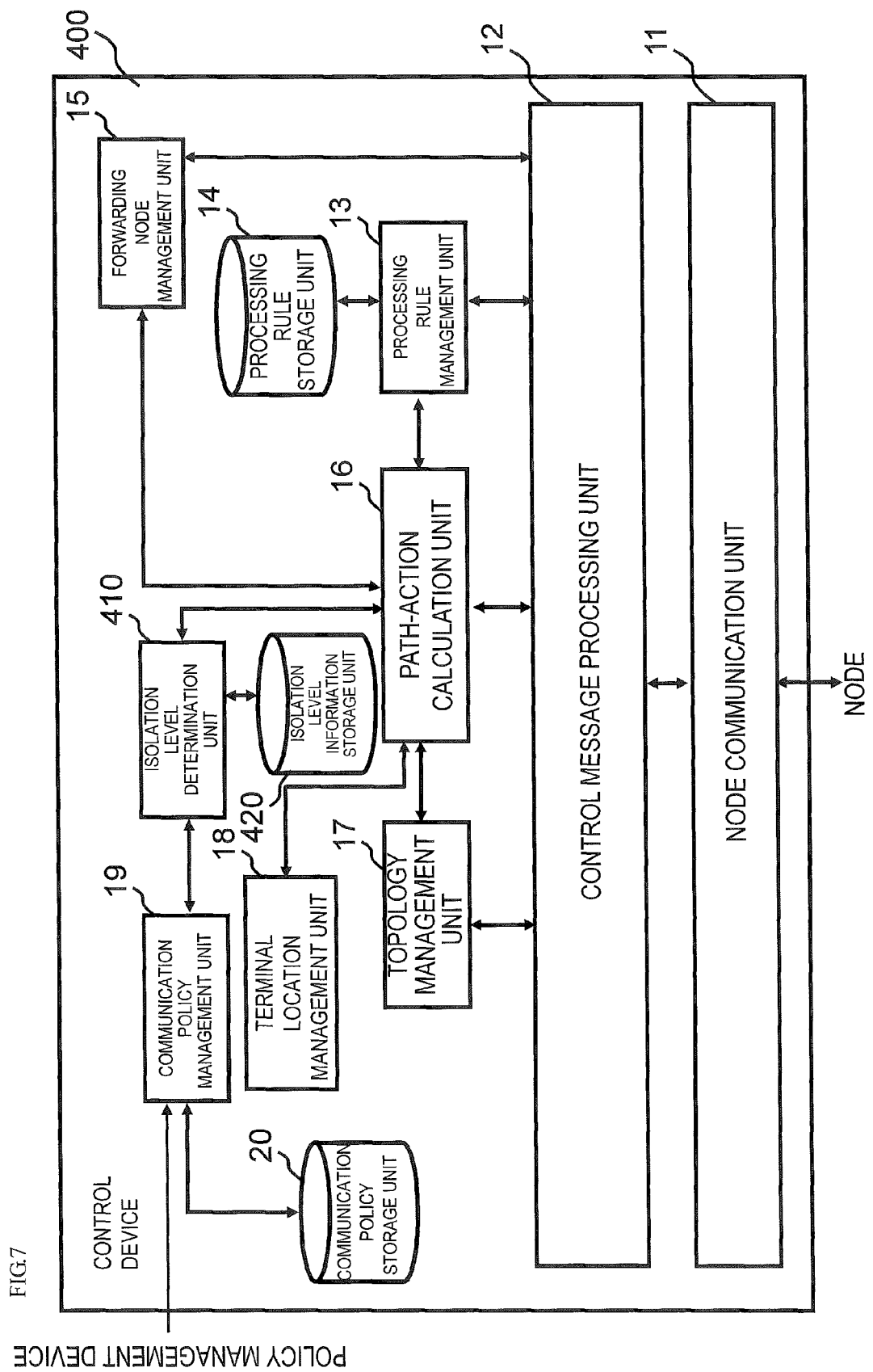
FIG. 7 is a block diagram representing a detailed configuration of a control device of the first exemplary embodiment of the disclosure.

FIG. 7 is a block diagram representing a detailed configuration of the control device 400 of the present exemplary embodiment. Referring to FIG. 7, the control device 400 is configured by being provided with a node communication unit 11 that performs communication with the forwarding nodes 201 to 204, a control message processing unit 12, a processing rule management unit 13, a processing rule storage unit 14, a forwarding node management unit 15, a path-action calculation unit 16, a topology management unit 17, a terminal location management unit 18, a communication policy management unit 19, a communication policy storage unit 20, the isolation level determination unit 410, and the isolation level information storage unit 420. These operate in the following respective ways.

The control message processing unit 12 analyzes a control message received from a forwarding node and delivers control message information to a relevant processing means inside the control device 400.

The processing rule management unit 13 manages how the processing rule (packet handling operation) is set and in which forwarding node. Specifically, a processing rule (packet handling operation) created by the path-action calculation unit 16 is registered in the processing rule storage unit 14 and set in a forwarding node, and registration information of the processing rule storage unit 14 is updated in response to a case where a change has occurred in a processing rule (packet handling operation) set in the forwarding node, by a processing rule (packet handling operation) deletion notification or the like from a processing node.

The forwarding node management unit 15 manages the capability (for example, the number and type of ports, the type of actions supported, and the like) of forwarding nodes controlled by the control device 400.

The topology management unit 17 builds network topology information based on connection relationships of the forwarding nodes 201 to 204 collected via the node communication unit 11.

The terminal location management unit 18 manages information for identifying the location of a user terminal connected to a communication system, and also isolation level information of respective user terminals determined by the isolation level determination unit 410. In the present exemplary embodiment, a description is given using an IP address as information for distinguishing a user terminal, and a forwarding node identifier of a forwarding node to which the user terminal is connected and information of a port thereof, as information for identifying the location of the user terminal. Clearly, instead of this information, information provided by the authentication device 330, for example, may be used to identify a terminal and its location.

On receiving the communication policy information from the policy management device 300, the communication policy management unit 19 stores the information in the communication policy storage unit 20, and transmits the information to the isolation level determination unit 410.

On receiving the communication policy information from the communication policy management unit 19, the isolation level determination unit 410 refers to a result of the quarantine process of the user terminal received via the control message processing unit 12 and the path-action calculation unit 16, and to the isolation level information stored in the isolation level information storage unit 420, to perform a process (a communication policy correction process) of rewriting content denying access, among access destinations accessible from the user terminal 100, to access destinations for which the user terminal in question does not satisfy a condition requested by respective access destinations, and then transmits to the path-action calculation unit 16.

FIG. 8 is a descriptive diagram showing an example of the isolation level information stored in the isolation level information storage unit 420. Referring to FIG. 8, for each respective isolation level, isolation level information is shown, with an accessible range, namely a resource for which access is allowed (allowed resource), and a condition satisfying access to the respective isolation levels, as a set. The isolation level information storage unit 420 of the present exemplary embodiment is both a table for determining isolation level according to a result of a quarantine process and an accessibility table defining whether or not access is possible to respective access destinations for each isolation level. For example, a condition for allowing access to isolation level 1 is "no in-company prohibited application present", and an accessible range of isolation level 1 is "public server accessible from outside". In FIG. 8, to facilitate the description, access ranges and conditions are described using text, but the access range may also be described by an IP address or the like, as shown in a "destination" field in FIG. 6. In a case where the condition is that no prescribed prohibited application (app1, app2, app3) is present in the user terminal 100, for example, a form that is easily readable by the isolation level determination unit 410 is described, as in "prohibit=app1, app2, app3".

Figure 9:
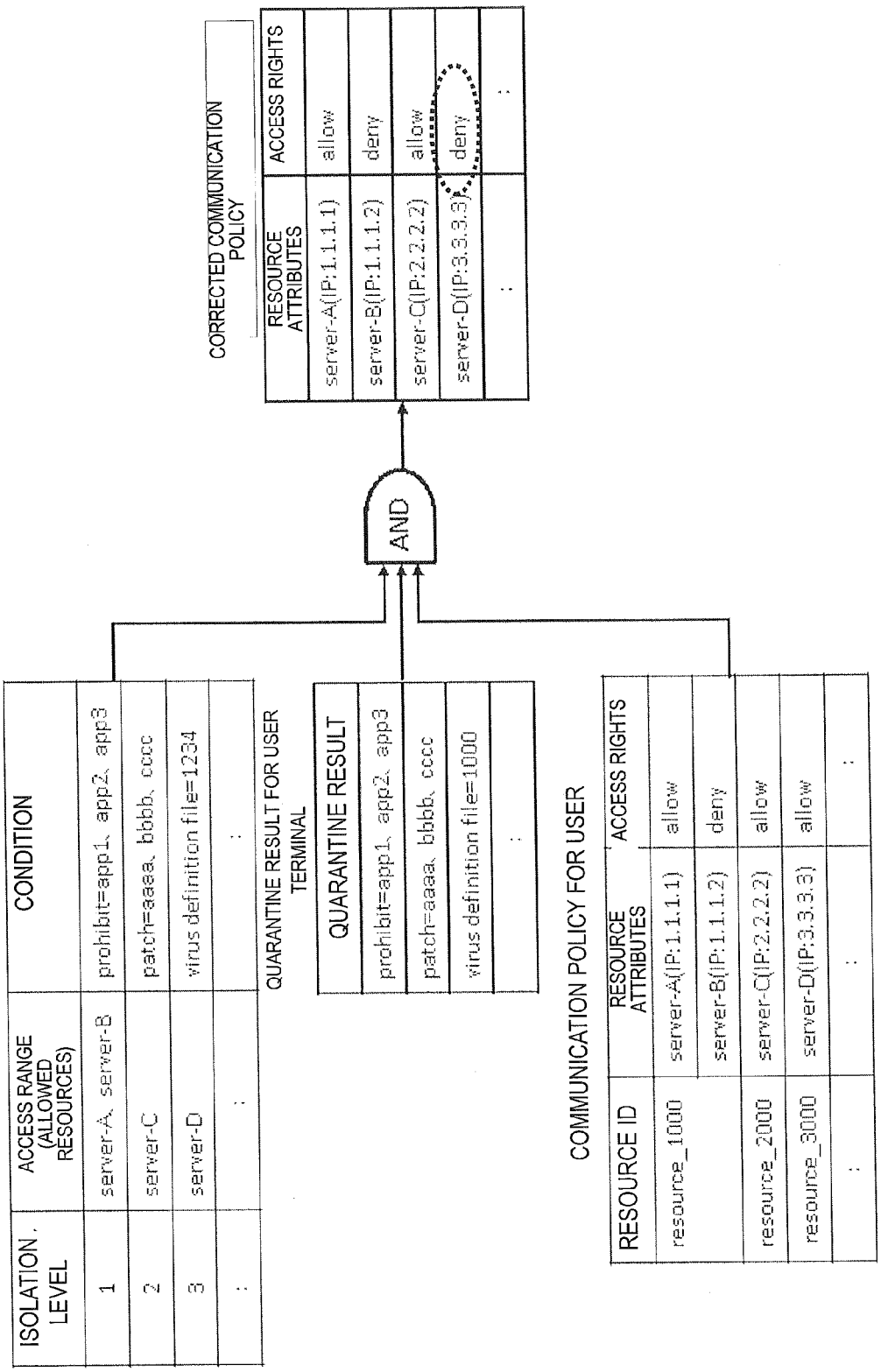
FIG. 9 is a diagram for describing correction processing for a communication policy in an isolation level determination unit of the first exemplary embodiment of the disclosure.

FIG. 9 is a diagram for describing correction processing for a communication policy in the isolation level determination unit 410 described above. Referring to FIG. 9, the isolation level determination unit 410 determines an isolation level based on a quarantine result of the user terminal transmitted from the quarantine agent unit 110 of the user terminal 100. Next, the isolation level determination unit 410 reads content corresponding to the determined isolation level from the isolation level information storage unit 420 and corrects the communication policy. That is, the isolation level determination unit 410 can also calculate a logical product of the isolation level information stored in the isolation level information storage unit 420, the quarantine result of the user terminal transmitted from the quarantine agent unit 110 of the user terminal 100, and the user communication policy transmitted from the policy management device 300.

For example, if the logical product of the isolation level information of FIG. 9, the quarantine result of the user terminal, and the user communication policy is calculated, the quarantine result for the user terminal satisfies conditions concerning prohibited applications as defined for isolation level 1 and isolation level 2, and patch application state, but since a virus definition file version is not the latest (#1234), the isolation level for the user is determined to be "2". If the user communication policy with "server-C", which has an access range of isolation level 2, and "server-A, server-B", which have access ranges of isolation level 1, are compared, the access rights for server-A is "allow" and for server-B is "deny". The access rights value of resource attribute "server-D" of the user communication policy is "allow", but since this is not accessible at the isolation level of the user, the value is "deny" From the above, the communication range of the user determined by the communication policy is corrected to "server-A=allow, server-B=deny, server-C=allow, server-D=deny".

The isolation level determination unit 410 transmits the corrected communication policy and the isolation level of the user terminal 100 determined in the process of correcting the communication policy, to the path-action calculation unit 16 that functions as the access control unit 430.

On receiving the corrected communication policy from the isolation level determination unit 410, the path-action calculation unit 16, in accordance with the communication policy, refers to the network topology held in the topology management unit 17, and calculates a forwarding path of a packet to an access destination that can be accessed by the user terminal 100, in addition to creating a processing rule (packet handling operation) realizing packet forwarding following the forwarding path.

Specifically, based on location information of a communication terminal managed by the terminal location management unit 18 and the network topology information build by the topology management unit 17, the path-action calculation unit 16 calculates a forwarding path of the packet to the access destination that is accessible by the user terminal 100. Next, the path-action calculation unit 16 obtains port information and the like of a forwarding node in the forwarding path from the forwarding node management unit 15, and requests an action to be executed in the forwarding node in the path for realizing the calculated forwarding path, and a matching rule for identifying flow in which the action is to be applied. It is to be noted that the matching rule can be created using a source IP address, a destination IP address, a condition (option) and the like of the communication policy in FIG. 6. Accordingly, in a case of the first entry of the communication policy in FIG. 6, for a packet from a source IP address 192.168.100.1 to a destination IP address 192.168.0.1, respective processing rules (packet handling operations) are created to determine a forwarding node that is a next hop and an action for forwarding from ports to which the network resources 500A and 500B are connected.

Moreover based on the isolation level of the user terminal 100 determined by the isolation level determination unit 410, the path-action calculation unit 16 of the present exemplary embodiment allows only access to another user present in an isolation level that is more relaxed than the isolation level of the user in question, creates a processing rule (packet handling operation) denying access to other users present in isolation levels outside of this, and sets these processing rules (packet handling operations) in the forwarding nodes 201 to 204.

FIG. 10 is a diagram for describing a process of determining whether or not access is possible among users by the path-action calculation unit 16. As shown in the table on the left side in FIG. 10, isolation levels in 5 stages, from isolation level 1 that is most relaxed as regards security to isolation level 5 that is strictest as regards security, are set. In the example in FIG. 10, user A belongs to isolation level 5, users B and C belong to isolation level 3, user D belongs to isolation level 2, and user E belongs to isolation level 1 (no user belongs to isolation level 4). A rule is set such that access from a certain user to a user having an isolation level less than or equal to the isolation level of the user in question is allowed, and access to a user having an isolation level higher than the user in question is denied.

For example, since user A is at isolation level 5, access from user A to users B, C, D, and E (isolation levels 1 to 5) is allowed. Since user B is at isolation level 3, access from user B to users C, D, and E (isolation levels 1 to 3) is allowed. Similar determination processing is performed also for respective users C, D, and E.

In this way, the path-action calculation unit 16 creates a processing rule (packet handling operation) implementing whether or not access is possible from the user terminal 100 to other user terminals. It is to be noted that in the example in FIG. 10, access to other users belonging to the same isolation level is allowed, as for user B and user C, but access can also be denied. For example, in the example in FIG. 10, a rule may be used in which access from user B to user C who is present at the same isolation level is allowed, but access from user B to user C is denied. In addition, the number of isolation levels and sequence relationships shown in FIG. 10 are merely an example, and it is possible to add various types of modification.

Furthermore, either the processing rule (packet handling operation) implementing whether or not access is possible among the users as described above or the processing rule (packet handling operation) enabling or disenabling access to the network resources may be set first in a processing node, or they may be set at the same timing. Furthermore, in the abovementioned description, the processing rule (packet handling operation) implementing whether or not access is possible among the users is set, but in a case where an isolation level is also obtained for other nodes outside of the user terminals, it is possible to determine whether or not access is possible in accordance with the isolation level, and to set a processing rule (packet handling operation) implementing this.

The control device 400 as described above can also be realized by adding equivalent functions to the path-action calculation unit 16 functioning as the isolation level determination unit 410, the isolation level information storage unit 420, and the access control unit 430, as described above, based on an OpenFlow controller of Non Patent Literatures 1 and 2.

Further, respective parts (processing means) of the control device 400 shown in FIG. 7 can be realized by a computer program that stores the abovementioned respective information and executes the respective processes described above in a computer that configures the control device 400, using hardware thereof.

Further, the quarantine agent unit 110 shown in FIG. 2 can be realized by a computer program that stores the abovementioned respective information and executes the respective processes described above in a user terminal computer, using hardware thereof.

Figure 11:
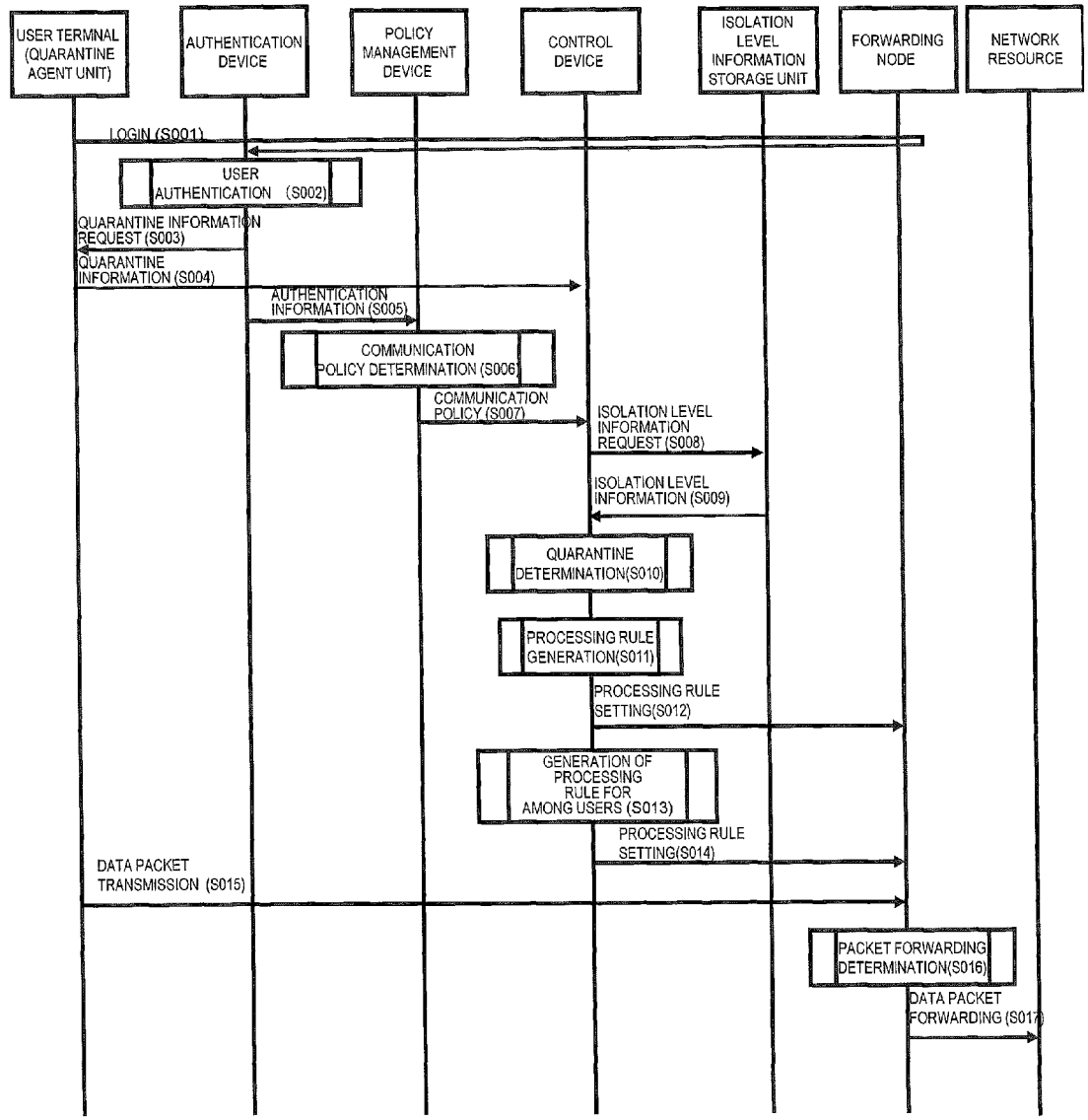
FIG. 11 is a sequence diagram representing a sequence of operations of the first exemplary embodiment of the disclosure.

Next, a detailed description is given concerning operations of the present exemplary embodiment, making reference to the drawings. FIG. 11 is a sequence diagram representing a sequence of operations of the present exemplary embodiment. Referring to FIG. 11, first, when the user terminal makes a login request to the authentication device 330, packet forwarding is performed to the authentication device 330 via forwarding nodes (S001 in FIG. 11). It is to be noted that a processing rule (packet handling operation) implementing communication between the user terminal and the authentication device 330 may be set in advance, or the control device 400 may perform the setting in response to a request from a forwarding node.

When a user authentication procedure for the user terminal is completed (S002 in FIG. 11), the authentication device 330 requests quarantine information with respect to the quarantine agent unit 110 of the user terminal (S003 in FIG. 11).

On receiving the request for quarantine information from the authentication device 330, the quarantine agent unit 110 of the user terminal executes quarantine processing and transmits quarantine information (a result of the quarantine processing) for the user terminal to the control device 400 (S004 in FIG. 11).

The authentication device 330 transmits authentication information to the policy management device 300 (S005 in FIG. 11).

The policy management device 300 that has received that authentication information refers to the communication policy storage unit 310 and the resource information storage unit 320 to determine a communication policy, based on the received authentication information (S006 in FIG. 11), and transmits a result thereof to the control device 400 (S007 in FIG. 11).

The control device 400 obtains information indicating an isolation level corresponding to quarantine information for the user terminal and an access range recognized in the isolation level in question, from the isolation level information storage unit 420 (S008, S009 in FIG. 11).

The control device 400 performs correction processing (quarantine determination) of the communication policy based on the communication policy of the user transmitted from the policy management device 300 and isolation level information received from the isolation level information storage unit 420 (S010 in FIG. 11).

The control device 400 generates processing rules (packet handling operations) for the user based on the corrected communication policy (S011 in FIG. 11), and sets the processing rules (packet handling operations) in the forwarding nodes (S012 in FIG. 11).

Furthermore, the control device 400 determines whether or not access is possible to other users, based on the isolation level information of the user terminal determined by the isolation level determination unit 410, generates a corresponding processing rule (packet handling operation) (S013 in FIG. 11), and sets the generated processing rule (packet handling operation) in the forwarding nodes (S014 in FIG. 11).

Thereafter, when the user terminal transmits a packet to a forwarding node (S015 in FIG. 11), the forwarding node performs a determination of packet forwarding in accordance with the processing rule (packet handling operation) set by the control device 400 (S016 in FIG. 11). As a result of the determination, in a case where access to the network resource is allowed, the forwarding node forwards the packet to the network resource in question (S017 in FIG. 11). On the other hand, in a case where access to the network resource is denied in accordance with the set processing rule (packet handling operation), the forwarding node drops the packet in question (not shown in FIG. 11).

In a case where the packet transmitted from the user terminal has a destination of another user terminal, the forwarding node refers to the processing rule (packet handling operation) and similarly performs a determination for packet forwarding (S016 in FIG. 11). In a case of a packet with a destination of another user terminal for which access is allowed, the forwarding node forwards the packet to the user terminal in question (S017 in FIG. 11). On the other hand, in a case where access to the destination user terminal is denied in accordance with the set processing rule (packet handling operation), the forwarding node drops the packet in question (not shown in FIG. 11).

As described above, according to the present exemplary embodiment, it is possible to realize stepwise access control between a user terminal and network resources, according, not only to a pre-set communication policy, but also to an isolation level determined based on the result of quarantine processing. Furthermore, in the present exemplary embodiment, access control among users can be realized in combined fashion.

It is to be noted that when the isolation level determination unit 410 of the control device 400 performs correction processing (quarantine determination processing) of a communication policy in step S010 in FIG. 11, the accessible range for a user may be corrected, in order, from a low isolation level number, and a processing rule (packet handling operation) may be generated at a point in time when correction of each isolation level is completed. In this way, the correction processing (quarantine determination processing) of the communication policy can be speeded up, and a user can access an isolation level range, namely an accessible range, in a stepwise manner.

In addition, a network resource providing a required service so that a user terminal raises isolation level is preferably disposed at the isolation level in question. For example, in the example in FIG. 9, by disposing a server providing a virus definition file at isolation level 2, the user terminal can obtain the latest virus definition file (#1234) from the server providing the virus definition file. If quarantine processing is again done after updating of the virus definition file, the next time a determination of isolation level 3 is made. In this way, rather than excluding access all together from user terminals of a low isolation level, it is possible to have access to network resources in a stepwise manner in accordance with progression of quarantine processing of a user terminal.

Furthermore, a description has been given in which the quarantine agent unit 110 of the user terminal receives a request for quarantine information from the authentication device 330 and transmits quarantine information to the control terminal 400, but it is also possible to use a configuration in which the quarantine agent unit 110 executes quarantine processing periodically and transmits the quarantine information to the control device 400. By so doing, it is possible to rapidly adjust the isolation level or the communication policy, in accordance with the state of the user terminal after setting processing rules (packet handling operations).

Second Exemplary Embodiment

Figure 12:
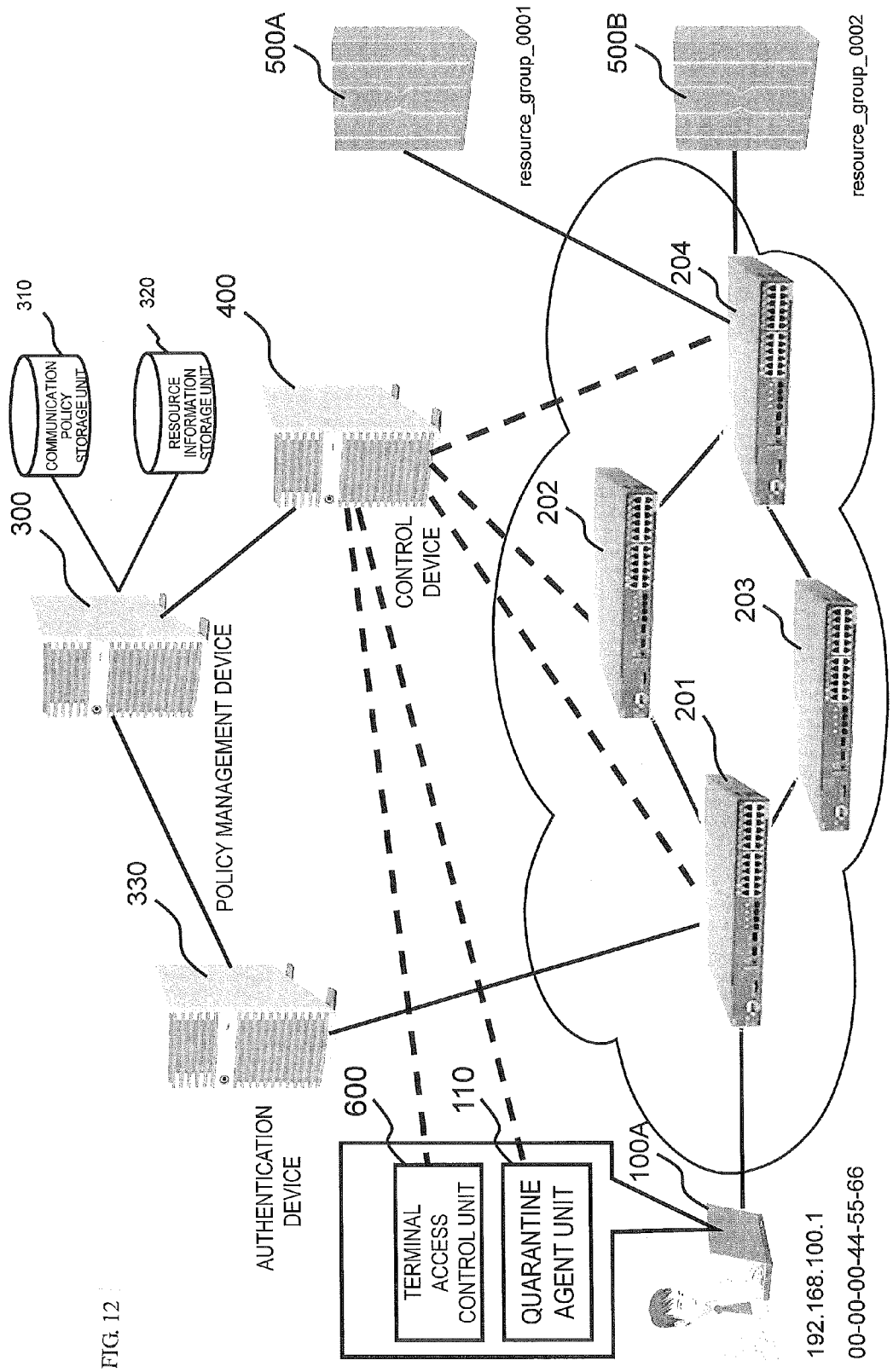
FIG. 12 is a diagram representing a configuration of an access control system of a second exemplary embodiment of the disclosure.

Next, a detailed description is given concerning a second exemplary embodiment of the present disclosure, making reference to the drawings. FIG. 12 is a diagram representing a configuration of a communication system of the second exemplary embodiment of the disclosure. A point of difference from the configuration shown in FIG. 2 is that a terminal access control unit 600 controlling whether or not a packet can be transmitted is added to a user terminal 100A. Since the configuration otherwise is equivalent to the description in FIG. 2 and the first exemplary embodiment, the description below is centered on points of difference.

The terminal access control unit 600 receives a corrected communication policy or isolation level information of a plurality of user terminals including isolation level of the user terminal 100A determined by an isolation level determination unit 410 of a control device 400; creates processing rules (packet handling operations) allowing or denying transmission of a packet transmitted by the user terminal 100A; and implements access control of a user terminal by these processing rules (packet handling operations).

Here, the terminal access control unit 600 may be realized as a function of a quarantine agent unit 110. In addition, the control device 400 may create a processing rule (packet handling operation), and the terminal access control unit 600 may implement only access control according to a processing rule (packet handling operation) created by the control device 400.

Figure 13:
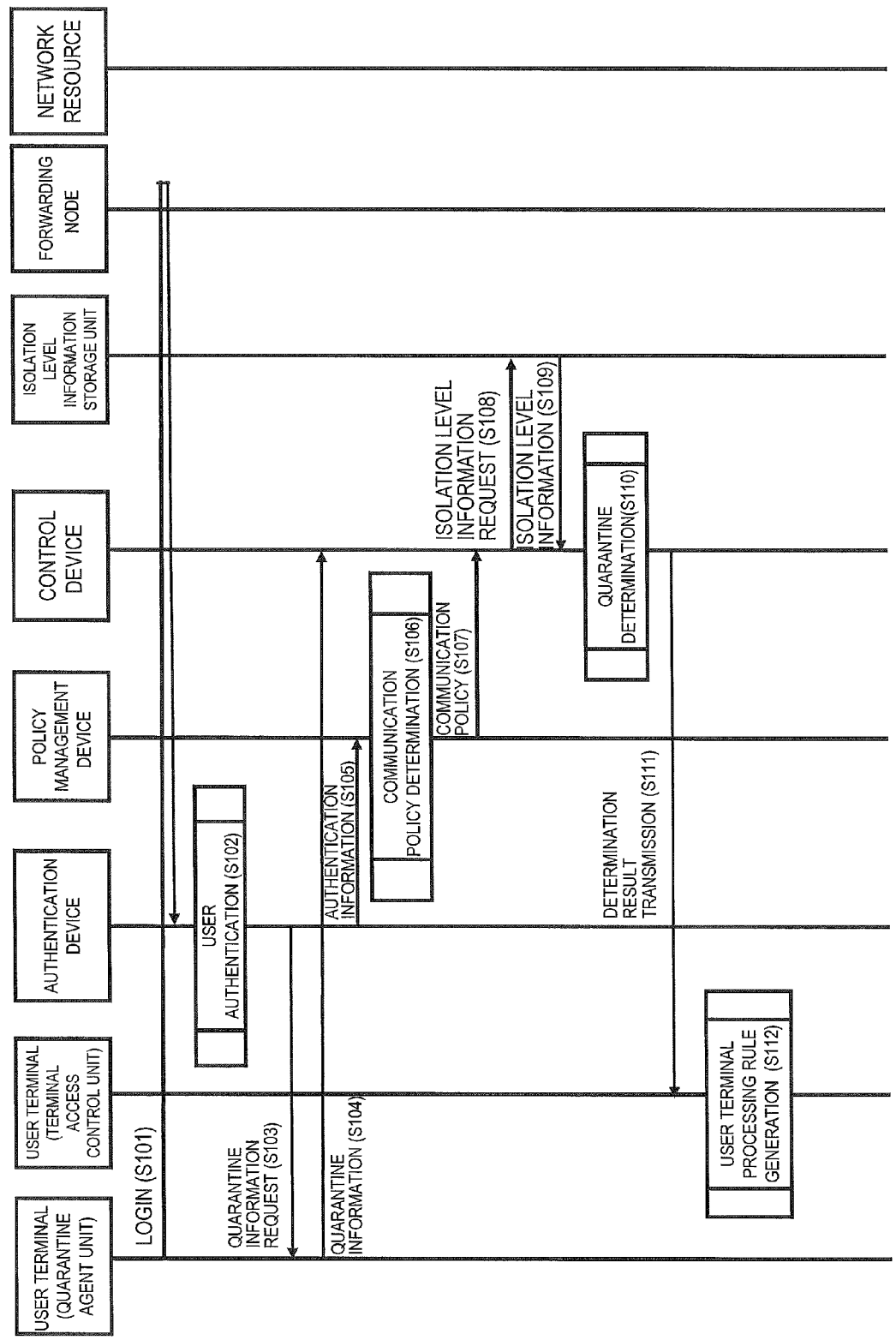
FIG. 13 is a sequence diagram representing a sequence of operations of the second exemplary embodiment of the disclosure.

Next, a description is given concerning operation of the second exemplary embodiment described above. FIG. 13 is a sequence diagram representing a sequence of operations of the second exemplary embodiment of the present disclosure. Operations from a user terminal making a login request to an authentication device 330 (S101 in FIG. 13) to the control device 400 performing correction processing (quarantine determination processing) of a communication policy (S110 in FIG. 13) are similar to the first exemplary embodiment, and so a description is omitted.

In the present exemplary embodiment, after performing correction processing (quarantine determination processing) of a communication policy, the control device 400 transmits the corrected communication policy or isolation level information of a plurality of user terminals including isolation level of the user terminal in question, to the terminal access control unit 600 of the user terminal 100A (S111 in FIG. 13).

The terminal access control unit 600 of the user terminal 100A creates a processing rule (packet handling operation) allowing or denying packet transmission to another node from the user terminal 100, based on the corrected communication policy or respective isolation level information received from the control device 400 (S112 in FIG. 13). Here, a method in which, when a processing rule (packet handling operation) is created to allow or deny access among respective user terminals, the terminal access control unit 600 determines whether or not to access is possible among respective users and creates a processing rule (packet handling operation), is similar to the first exemplary embodiment.

A processing rule (packet handling operation) used by the terminal access control unit 600 of the user terminal 100A may be the same as one held in a forwarding node, or packet filtering technology as in iptables may be used instead of this type of processing rule (packet handling operation).

Furthermore, the terminal access control unit 600 can also apply a processing rule (packet handling operation) allowing or denying forwarding of a packet, with respect to a physical NIC (Network Interface Card) inside the user terminal 100A; application is also possible with regard to virtual NICs held by respective VMs (Virtual Machines) operating inside the user terminal 100A; and application is also possible with respect to plural virtual switches operating inside the user terminal 100A. In this way, the terminal access control unit 600 can freely designate a place to execute access control inside the user terminal 100A.

As described above, according to the present exemplary embodiment, in addition to effects of the abovementioned first exemplary embodiment, it is possible to inhibit transmission of a packet to a destination that the user terminal 100A cannot access, and to reduce load on a forwarding node.

Third Exemplary Embodiment

Figure 14:
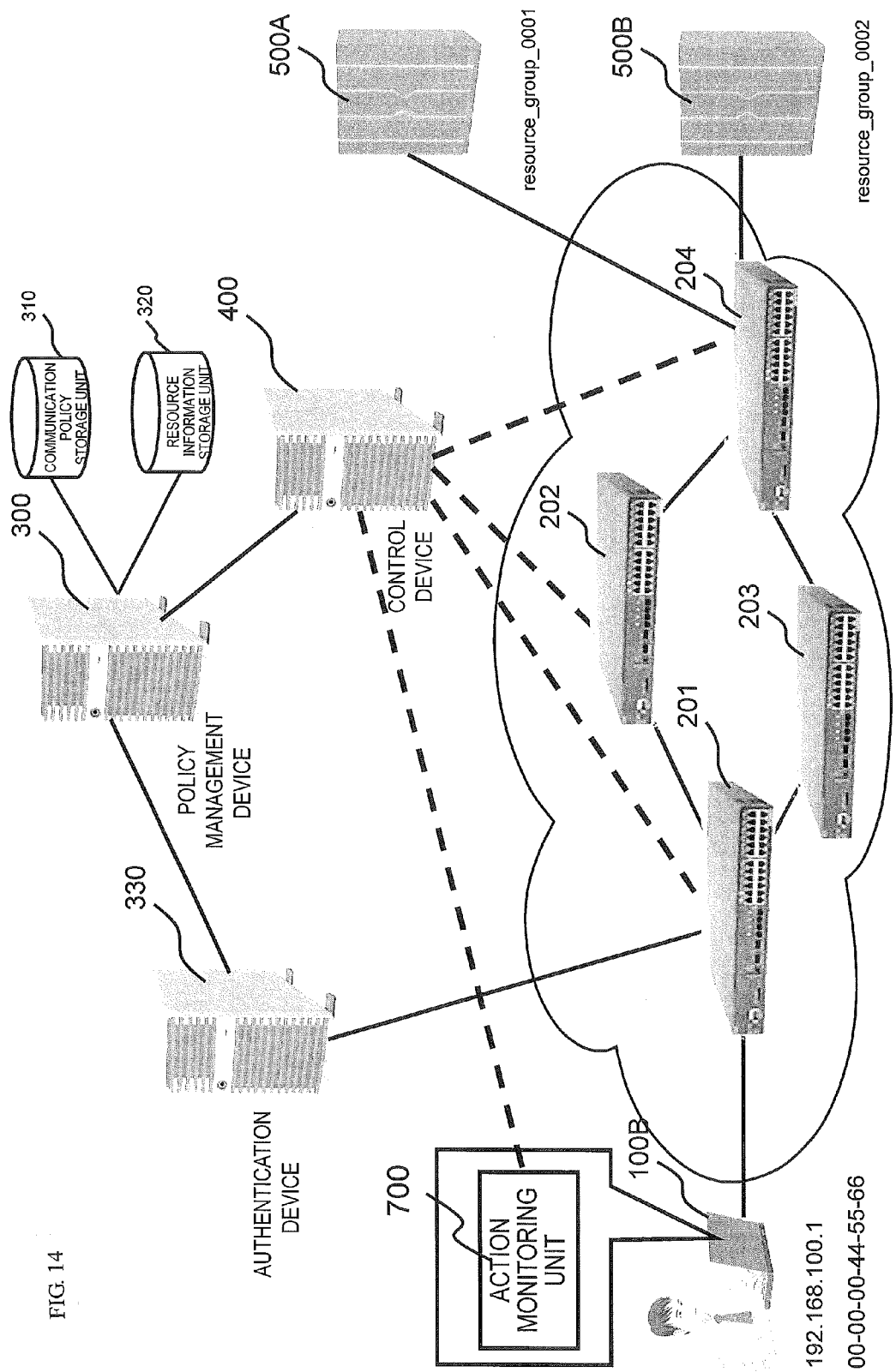
FIG. 14 is a diagram representing a configuration of an access control system of a third exemplary embodiment of the disclosure.

Next, a detailed description is given concerning a third exemplary embodiment of the present disclosure, making reference to the drawings. FIG. 14 is a diagram representing a configuration of a communication system of the third exemplary embodiment of the disclosure. Points of difference from the configuration shown in FIG. 2 are the point that an action monitoring unit 700 that monitors actions of a user terminal is provided instead of a quarantine agent unit 110, in a user terminal 100B, and the point that action of an isolation level determination unit 410 inside the control device 400 is changed. Since the configuration otherwise is equivalent to the description in FIG. 2 and the first exemplary embodiment, the description below is centered on points of difference.

The action monitoring unit 700 monitors actions of a user terminal and transmits action information that is a result thereof, to the isolation level determination unit 410 of the control device 400. The place (location) where the user terminal 100B exists, or time, or history of access to a Website or database, or history of usage of an application inside the user terminal 100B, may be cited as the action information.

In addition, in the present exemplary embodiment, an isolation level information storage unit 420 stores isolation level information, in which location information of where access is allowed (or location information of where access is denied) is set, in a condition field (refer to FIG. 8) of respective isolation level information shown in the first and second exemplary embodiments of the present disclosure. For example, in an example in FIG. 8, in a public server that is accessible from outside, in isolation level 1, access from a user terminal is allowed under a condition that prescribed forbidden applications are not present, but in the present exemplary embodiment, location information for allowed access (for example, "Tokyo", or the like) is set.

In the present exemplary embodiment below, to facilitate the explanation, a description is given concerning operations in a case of using information of locations (location information) where a user terminal is present. This type of action monitoring unit 700 can be configured from a GPS (Global Positioning System) device or the like. Furthermore, quarantine information of a user terminal described in the first and second exemplary embodiments of the present disclosure may be included as one item of the action information of the user terminal.

Figure 15:
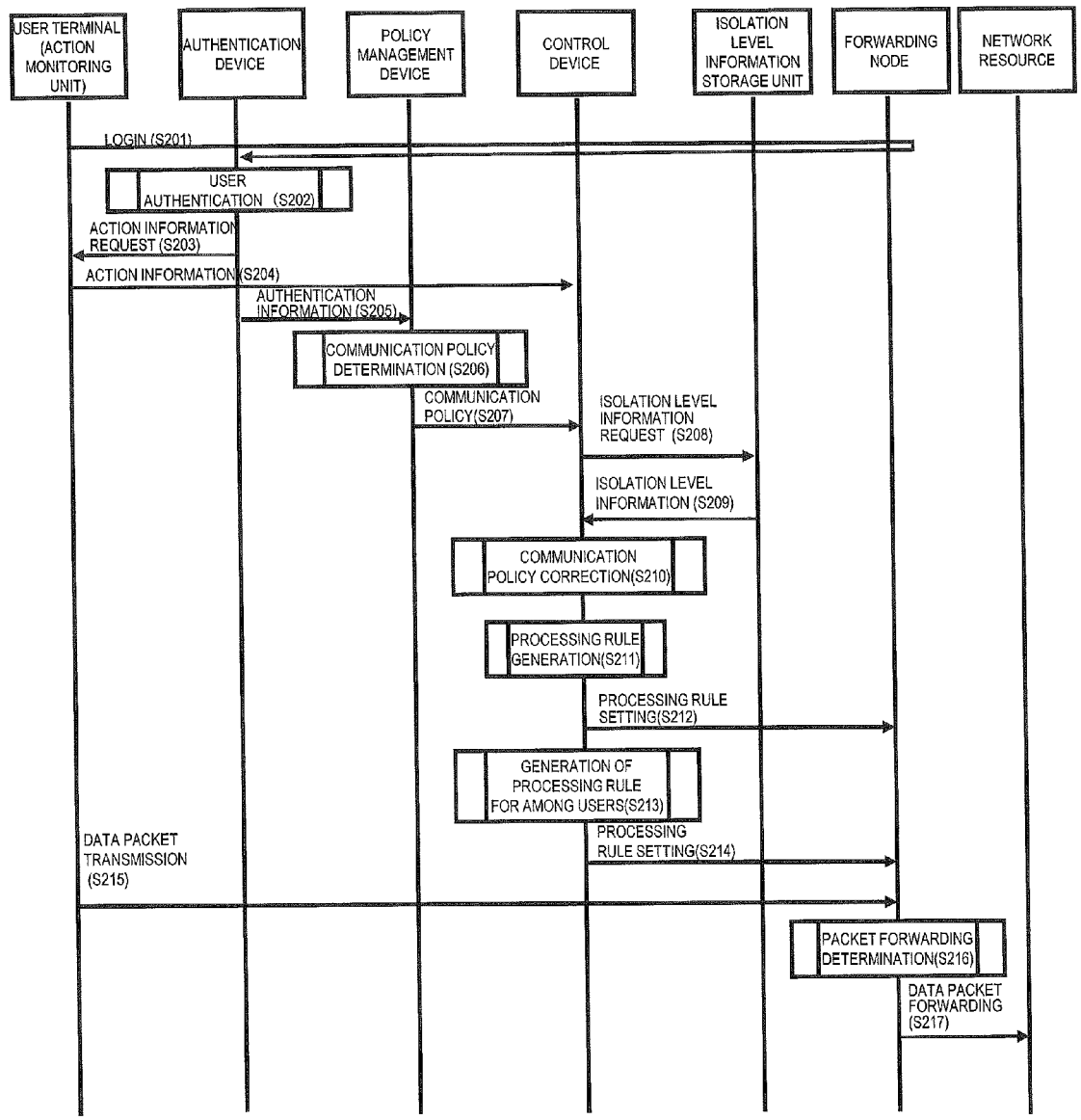
FIG. 15 is a sequence diagram representing a sequence of operations of the third exemplary embodiment of the disclosure.

FIG. 15 is a sequence diagram representing a sequence of operations of the present exemplary embodiment. When the user terminal makes a login request to an authentication device 330, operations as far as transmitting a packet to the authentication device 330 (S201 in FIG. 15) and the authentication device 330 performing user authentication (S202 in FIG. 15) are similar to the first exemplary embodiment, and descriptions are omitted.

After completing user authentication processing, the authentication device 330 makes a request for action information with respect to the action monitoring unit 700 of the user terminal (S203 in FIG. 15). On receiving the request for action information from the authentication device 330, the action monitoring unit 700 of the user terminal transmits action information to the control device 400 (S204 in FIG. 15), for example, that the location where the user terminal is logged in is "Tokyo". Normally, location information such as GPS and the like is coordinate information configured by latitude and longitude, but to facilitate the description here, a place name is used. It is to be noted that by using coordinate information a device and process to calculate the place name can be easily implemented.

On receiving authentication information from the authentication device 330 (S205 in FIG. 15), a policy management device 300, similar to the first exemplary embodiment, refers to a communication policy storage unit 310 and a resource information storage unit 320, based on the received authentication information, to determine a communication policy (S206 in FIG. 15) and to transmit the communication policy to the control device 400 (S207 in FIG. 15).

Next, the control device 400 obtains information indicating an isolation level corresponding to action information received from the action monitoring unit 700 of the user terminal 100B and an access range recognized in the isolation level in question, from the isolation level information storage unit 420 (S208, S209 in FIG. 11).

Next, the isolation level determination unit 410 of the control device 400 corrects the communication policy based on action information received from the action monitoring unit 700 of the user terminal 100B and isolation level information transmitted from the isolation level information storage unit 420 (S210 in FIG. 15). For example, determination is performed for isolation levels, such as enabling access to a network of "isolation level 5" when the action information of the user terminal 100B is "Tokyo", enabling access to a network of "isolation level 3" when the action information of the user terminal 100B is "Osaka", and the like, and an access range indicated in the communication policy is corrected. With regard to the method of correcting communication policy according to isolation level, it is possible to use the same method (refer to FIG. 8 and FIG. 9) of correcting a communication policy shown in the first and second exemplary embodiments of the present disclosure.

Thereafter, the control device 400 generates processing rules (packet handling operations) for between the user terminal 100B and a network resource (S211 in FIG. 15) based on an isolation level determined by the isolation level determination unit 410, and sets these processing rules (packet handling operations) in a forwarding node (S212 in FIG. 15).

Furthermore, similar to the first exemplary embodiment described above, the control device 400 creates processing rules (packet handling Operations) implementing enabling or disenabling access to user terminals (S213 in FIG. 15) and sets these processing rules (packet handling operations) in forwarding nodes (S214 in FIG. 15).

Thereafter, a sequence of processes is performed in which the action monitoring unit 700 of the user terminal 100B periodically transmits action information of a user to the control device 400, and each time action information of the user is received, the control device 400 makes a determination of an isolation level of the user, corrects a communication policy based on the result thereof, creates a processing rule (packet handling operation), and sets this in the forwarding node. Or, the isolation level determination unit 410 of the control device 400 may be arranged to periodically make a request for action information of a user with respect to the action monitoring unit 700 of a user terminal, and receive the action information for the user.

In addition, the action information of a user may be provided to the policy management device 300 and determination performed of the communication policy of the user based on the action information.

As described above, according to the present exemplary embodiment, it is possible to perform control so as to only allow access to an isolation level determined in advance in accordance with action information such as the location at which the user terminal exists or the time.

Descriptions have been given above of respective exemplary embodiments of the present disclosure, but the present disclosure is not limited to only configurations of the abovementioned exemplary embodiments, and further modifications, substitutions, and adjustments may be added within a scope that does not depart from a fundamental technical concept of the present disclosure. For example, in the abovementioned first exemplary embodiment a description was given in which the control device 400, the authentication device 330, the policy management device 300, the communication policy storage unit 310, and the resource information storage unit 320 are each provided independently, but it is also possible to use a configuration in which these are integrated or omitted as appropriate.

In addition, in the abovementioned exemplary embodiment a description was given in which access control is performed by assigning a role ID to a user as shown in FIG. 3 to FIG. 6, but it is also possible to perform access control using a user ID assigned for each user, an access ID such as a MAC address, location information of a user terminal 100, or the like.

Furthermore, in the abovementioned exemplary embodiment a description was given in which the user terminal 100 performs an authentication procedure with the authentication device 330 via the forwarding node 200, but it is also possible to use a configuration in which the user terminal 100 communicates directly with the authentication device 330 to implement an authentication procedure.

Finally, preferred modes of the present invention are summarized.

(First Mode)
(Refer to the communication system according to the abovementioned first aspect.)
(Second Mode)
With regard to the communication system of the first mode, the communication system is provided with a quarantine agent that implements quarantine processing of a user terminal at prescribed timing, in a user terminal, and notifies a quarantine result to the isolation level determination unit, unit as the information acquisition unit.
(Third Mode)
With regard to the communication system of the second mode, the communication system has a requirement to be satisfied that is determined for each of the isolation levels, and the isolation level determination unit determines an isolation level according to whether or not the quarantine result notified from the quarantine agent unit satisfies the requirement
(Fourth Mode)
With regard to the communication system of any one of the first to third modes, the communication system further includes a communication policy management unit that provides a communication policy to be applied to a user for whom authentication has succeeded, wherein accessibility determined by the communication policy is corrected using information defined in the isolation level information storage unit.
(Fifth Mode)
With regard to the communication system of any one of the first to fourth modes, in the communication system the access control unit controls whether or not access is possible between the user terminal and another node, based on the determined isolation level and an isolation level of the other node.
(Sixth Mode)
With regard to the communication system of any one of the first to fifth modes, in the communication system the access control unit controls the forwarding node by setting, in the forwarding node, a processing rule (packet handling operation) that determines a matching rule matching a packet and a process to be applied to the packet that conforms to the matching rule.
(Seventh Mode)
With regard to the communication system of the sixth mode, in the communication system the access control unit controls the forwarding node so as to delete an unnecessary processing rule (packet handling operation), and in a case of not holding a processing rule (packet handling operation) having a matching rule that matches a received packet, causes the received packet to be dropped.
(Eighth Mode)
With regard to the communication system of any one of the first to seventh modes, in the communication system a terminal access control unit that controls whether or not transmission of a packet is possible is provided in the user terminal, and the isolation level determination unit or the access control unit gives an instruction to inhibit transmission of a packet, with respect to the terminal access control unit.
(Ninth Mode)
With regard to the communication system of the first mode, in the communication system an action monitoring unit that monitors action of a user terminal and gives notification to the isolation level determination unit is provided in the user terminal, as the information acquisition unit.
(Tenth Mode)
With regard to the communication system of the ninth mode, in the communication system the isolation level determination unit uses location information of a user terminal included in the action information to determine an isolation level. It is noted that any combination (including selection of elements contained in any of the modes) of the modes disclosed above can be implemented within the basic concept of the present entire disclosure.
(Eleventh Mode)
(Refer to the control device (control apparatus) according to the abovementioned second aspect.)
Note further modes are possible in accordance with any of the preceding modes set forth herein.
(Twelfth Mode)
(Refer to the communication method according to the abovementioned third aspect.) Note further modes are possible in accordance with any of the preceding modes set forth herein.
(Thirteenth Mode)
(Refer to the program according to the abovementioned fourth aspect.) It is to be noted that the abovementioned eleventh to thirteenth modes can be expanded to be applicable to the second to tenth modes in any combination and/or selection thereof, similar to the abovementioned first mode.

It is to be noted that that each disclosure of the aforementioned patent literatures and non-patent literatures is incorporated herein in entirety thereof by reference thereto. Modifications and adjustments of exemplary embodiments are possible within the scope of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LIST

11 node communication unit
12 control message processing unit
13 processing rule management unit
14 processing rule storage unit
15 forwarding node management unit
16 path-action calculation unit
17 topology management unit
18 terminal location management unit
19 communication policy management unit 20 communication policy storage unit
100, 100A, 100B user terminal
110a information acquisition unit
110 quarantine agent unit
200, 201, 202, 203, 204 forwarding node
300 policy management device (policy management apparatus)
310 communication policy storage unit
320 resource information storage unit
330 authentication device (authentication apparatus)
400 control device (control apparatus)
410 isolation level determination unit
420 isolation level information storage unit
430 access control unit
500, 500A, 500B network resource
600 terminal access control unit
700 action monitoring unit

What is claimed is:

1. A communication system, comprising:
    an information acquisition unit that acquires information for determining an isolation level to which a user terminal belongs, from said user terminal;
    an isolation level determination unit that determines an isolation level to which said user terminal belongs, based on said acquired information;
    an isolation level information storage unit that defines whether or not access is possible to respective access destinations for each isolation level;
    an access control unit that causes at least one forwarding node to implement forwarding or dropping of a packet, in accordance with whether or not access is possible to said respective access destinations; and
    said at least one forwarding node that forwards the packet in accordance with control of said access control unit,
    wherein said access control unit controls said at least one forwarding node closest to a terminal of a forwarding path from said terminal to said access destinations at least by setting, in said at least one forwarding node, a packet handling operation that determines a matching rule matching the packet and a process to be applied to the packet that conforms to said matching rule.

2. The communication system according to claim 1, further comprising a quarantine agent unit that implements quarantine processing of said user terminal at a prescribed timing, in said user terminal, and notifies a quarantine result to said isolation level determination unit, as said information acquisition unit.

3. The communication system according to claim 2, wherein a requirement to be satisfied is determined for each of isolation levels, and
    wherein said isolation level determination unit determines the isolation level according to whether or not the quarantine result notified from said quarantine agent unit satisfies said requirement.

4. The communication system according to claim 1, further comprising a communication policy management unit that provides a communication policy to be applied to a user for whom authentication has succeeded,
    wherein accessibility determined by said communication policy is corrected by using information defined in said isolation level information storage unit.

5. The communication system according to claim 1, wherein said access control unit controls whether or not access is possible between said user terminal and an other node, based on said determined isolation level and an isolation level of the other node.

6. The communication system according to claim 1, wherein a terminal access control unit that controls whether or not transmission of a packet is possible is provided in said user terminal, and
    wherein said isolation level determination unit or said access control unit gives an instruction to inhibit transmission of a packet, with respect to said terminal access control unit.

7. The communication system according to claim 1, wherein an action monitoring unit that monitors action of said user terminal and gives notification to said isolation level determination unit is provided in said user terminal, as said information acquisition unit.

8. The communication system according to claim 1, wherein the communication system sets the packet handling operation in said at least one forwarding node in the user terminal side on the forwarding path.

9. The communication system according to claim 1, wherein said at least one forwarding nodes comprises a switching device for processing the packet in accordance with a processing rule that associates the matching rule matching the packet and a processing content applied to the packet that conforms to the matching rule.

10. The communication system according to claim 1, wherein said at least one forwarding nodes comprises a switching device for processing the packet.

11. A control apparatus, adapted to be disposed in a communication system including an information acquisition unit that acquires information for determining an isolation level to which a user terminal belongs, from said user terminal, and at least one forwarding node that forwards a packet in accordance with control of said control apparatus, said control apparatus comprising:
    an isolation level determination unit that determines an isolation level to which said user terminal belongs, based on information acquired in said information acquisition unit;
    an isolation level information storage unit that defines whether or not access is possible to respective access destinations for each of isolation levels; and
    an access control unit that causes said at least one forwarding node to implement forwarding or dropping of the packet, in accordance with whether or not access is possible to said respective access destinations,
    wherein said access control unit controls said at least one forwarding node closest to a terminal of a forwarding path from said terminal to said access destinations at least by setting, in said at least one forwarding node, a packet handling operation that determines a matching rule matching the packet and a process to be applied to the packet that conforms to said matching rule.

12. The control apparatus according to claim 11, further comprising a quarantine agent unit that implements quarantine processing of said user terminal at a prescribed timing, in said user terminal, and notifies a quarantine result to said isolation level determination unit, as said information acquisition unit.

13. The control apparatus according to claim 12, wherein a requirement to be satisfied is determined for each of isolation levels, and
    wherein said isolation level determination unit determines an isolation level according to whether or not a quarantine result notified from said quarantine agent unit satisfies said requirement.

14. The control apparatus according to claim 11, further comprising a communication policy management unit that provides a communication policy to be applied to a user for whom authentication has succeeded, wherein accessibility determined by said communication policy is corrected by using information defined in said isolation level information storage unit.

15. The control apparatus according to claim 11, wherein said access control unit controls whether or not access is possible between said user terminal and an other node, based on said determined isolation level and an isolation level of the other node.

16. The control apparatus according to claim 11, wherein a terminal access control unit that controls whether or not transmission of a packet is possible is provided in said user terminal, and wherein said isolation level determination unit or said access control unit gives an instruction to inhibit transmission of a packet, with respect to said terminal access control unit.

17. The control apparatus according to claim 11, wherein an action monitoring unit that monitors action of a user terminal and gives notification to said isolation level determination unit is provided in said user terminal, as said information acquisition unit.

18. A communication method, comprising:

acquiring information for determining an isolation level to which a user terminal belongs, from said user terminal;

determining an isolation level to which said user terminal belongs, based on said acquired information;

referring to isolation level information defining whether or not access is possible to respective access destinations, for each of isolation levels, and causing at least one forwarding node to implement forwarding or dropping of a packet, in accordance with whether or not access is possible to said respective access destinations; and controlling said at least one forwarding node closest to a terminal of a forwarding path from said terminal to said access destinations at least by setting, in said at least one forwarding node, a packet handling operation that determines a matching rule matching the packet and a process to be applied to the packet that conforms to said matching rule.

\* \* \* \* \*